United States Patent [19]

Asada

[11] Patent Number: 5,825,987
[45] Date of Patent: Oct. 20, 1998

[54] CHARACTER OUTPUT DEVICE

[75] Inventor: Kei Asada, Kanagawa, Japan

[73] Assignee: Fuji Xerox Co., Ltd., Tokyo, Japan

[21] Appl. No.: 683,731

[22] Filed: Jul. 18, 1996

[30] Foreign Application Priority Data

Jul. 19, 1995 [JP] Japan .................................. 7-183129

[51] Int. Cl.[6] .............................................. G06K 15/00
[52] U.S. Cl. ........................................ 395/110; 395/114
[58] Field of Search ..................................... 395/101, 110,
395/112, 114, 115, 116, 167, 168, 170,
805; 358/470; 382/177, 182; 345/143, 141,
115, 142; 400/61, 62, 67, 70, 72, 83, 171,
172

[56] References Cited

U.S. PATENT DOCUMENTS

| | | | |
|---|---|---|---|
| 4,594,674 | 6/1986 | Boulia et al. ........................... | 395/110 |
| 5,410,640 | 4/1995 | Morikawa et al. ..................... | 395/110 |

FOREIGN PATENT DOCUMENTS

| | | |
|---|---|---|
| 60-80895 | 5/1985 | Japan . |
| 62-208091 | 9/1987 | Japan . |
| 6-59851 | 3/1994 | Japan . |

OTHER PUBLICATIONS

Apple Computer, Inc., "Laser Writer Reference", pp. 34–41, May 19, 1995.

*Primary Examiner*—Arthur G. Evans
*Attorney, Agent, or Firm*—Finnegan, Henderson, Farabow, Garrett & Dunner, L.L.P.

[57] ABSTRACT

A font substitution printer serving as a character output device includes a substitute font generation section, a storage section and other sections. The storage section includes a font attribute data base consisting of the font names, typeface names, encoding names and metrics names of loaded fonts and usable fonts, a typeface attribute base, and a substitute encoding data base storing therein information as to a relationship between encodings and other encodings which substitute for the former encodings. The substitute font generation section extracts a typeface name, an encoding name and a metrics name from an output requested font name, selects a substitute typeface most similar in the typeface attribute to the extracted typeface name, and, out of substitute fonts consisting of one or more loaded fonts which satisfy not only the substitute encoding that is obtained in accordance with the extracted encoding name but also the selected substitute typeface, creates a substitute font with the weight or metrics thereof adjusted.

16 Claims, 13 Drawing Sheets

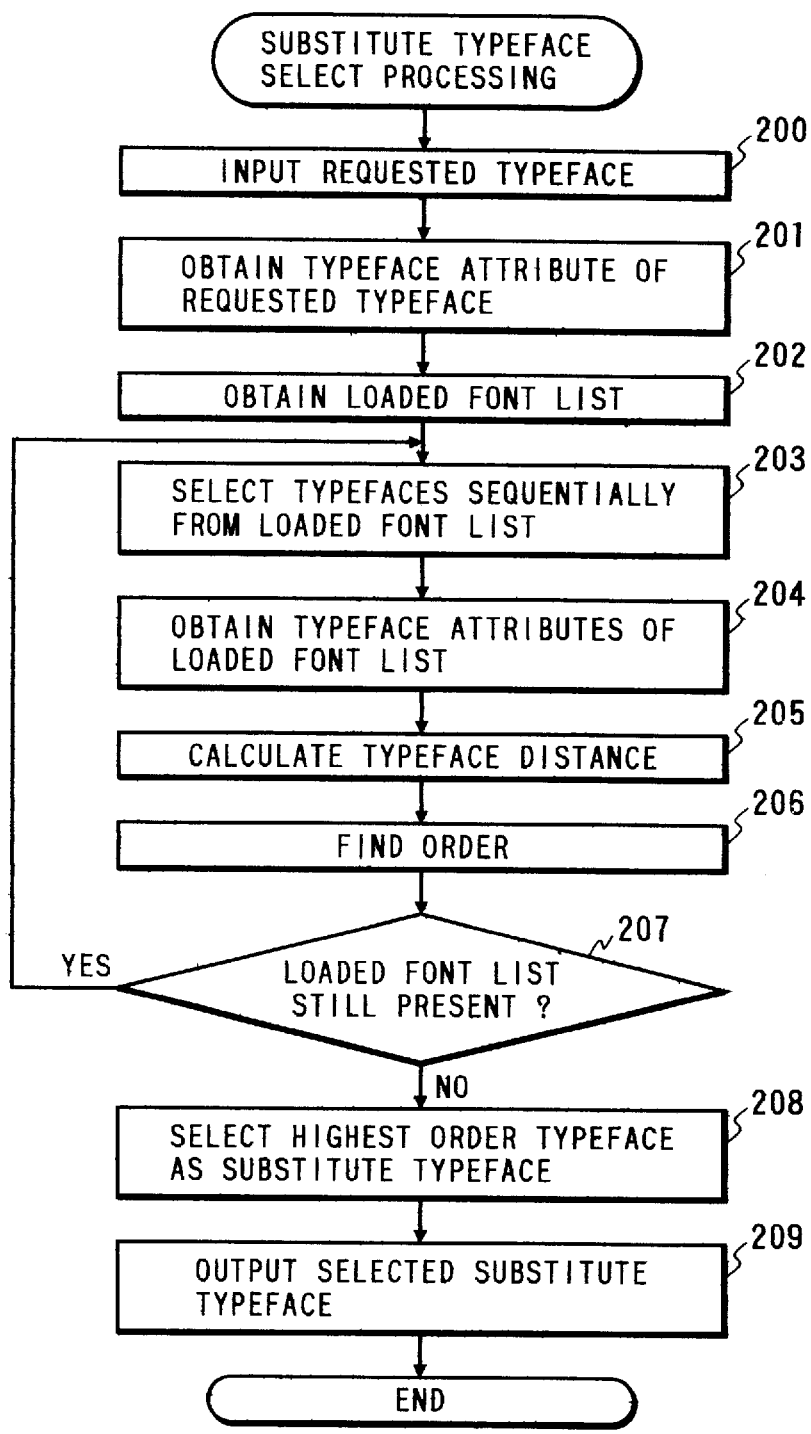

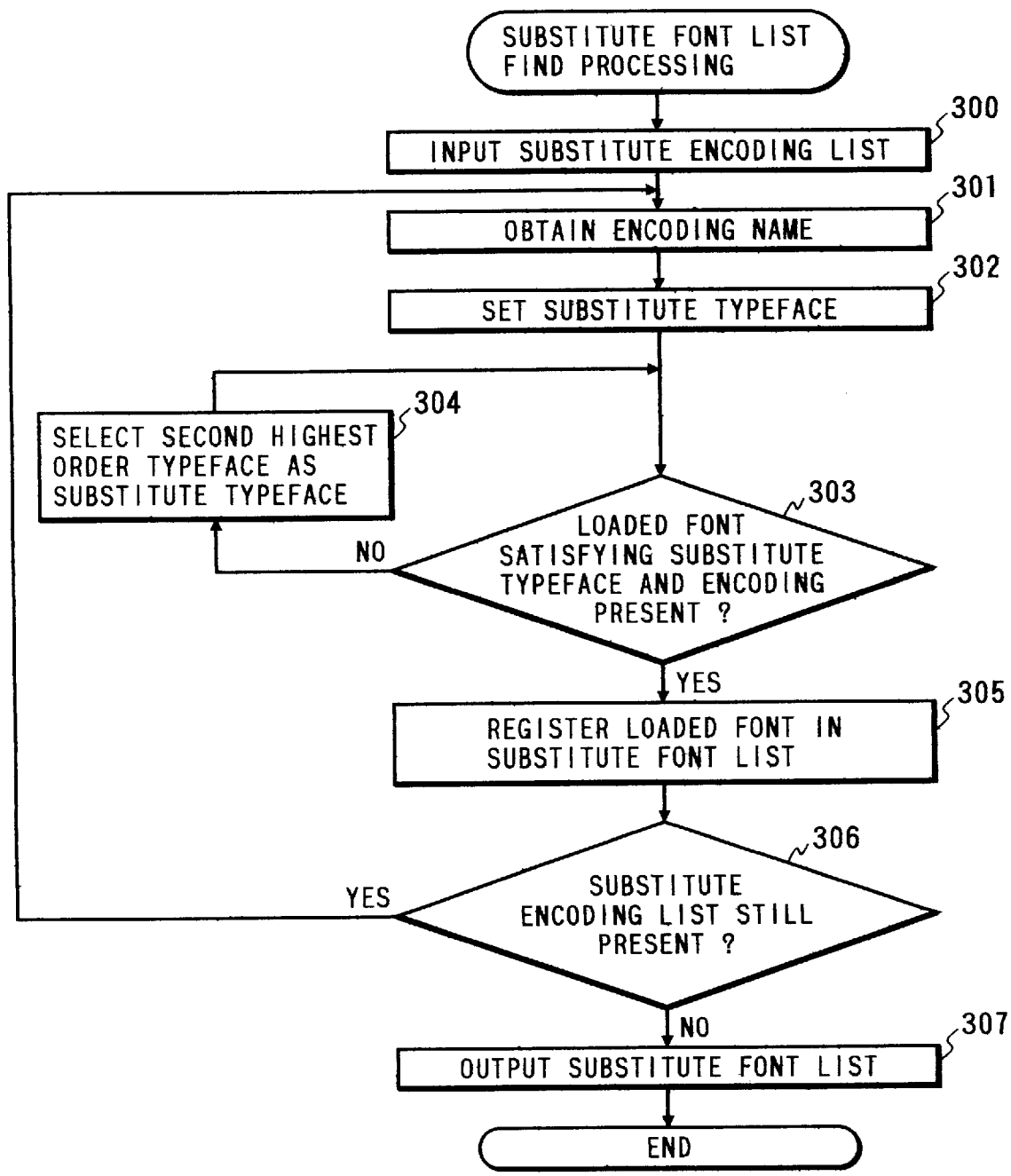

FIG. 6

| MINCHO – L2 |
|---|
| MINCHO – M3 |
| MINCHO – B6 |
| GOTHIC – B6 |
| GOTHIC – H8 |

FIG. 7

| FONT NAME | TYPEFACE NAME | ENCODING NAME | METRICS NAME |
|---|---|---|---|
| MINCHO – L1 | MINCHO – W1 | ENCODE – A | MINCHO – 1 |
| MINCHO – L2 | MINCHO – W1 | ENCODE – B | MINCHO – 2 |
| MINCHO – M3 | MINCHO – W3 | ENCODE – A | MINCHO – 3 |
| MINCHO – M4 | MINCHO – W3 | ENCODE – C | MINCHO – 4 |
| MINCHO – B5 | MINCHO – W5 | ENCODE – A | MINCHO – 5 |
| MINCHO – B6 | MINCHO – W5 | ENCODE – B | MINCHO – 6 |
| MINCHO – H7 | MINCHO – W7 | ENCODE – A | MINCHO – 7 |
| MINCHO – H8 | MINCHO – W7 | ENCODE – C | MINCHO – 8 |
| GOTHIC – B6 | GOTHIC – W5 | ENCODE – B | MINCHO – 6 |
| GOTHIC – H8 | GOTHIC – W7 | ENCODE – C | MINCHO – 8 |
| ⋮ | ⋮ | ⋮ | ⋮ |

FIG. 8

| WEIGHT COEFFICIENT | 10 | 10 | 1 | 4 | 4 | 80 |
|---|---|---|---|---|---|---|
| TYPEFACE NAME | VERTICAL STEM WIDTH | HORIZONTAL STEM WIDTH | BOSOM WIDTH | BOUNDING BOX RATE | BLACK SPOT RATE | SERIF RATE |
| MINCHO-W1 | 20 | 10 | 200 | 50 | 40 | 2.5 |
| MINCHO-W3 | 25 | 11 | 200 | 52 | 45 | 2.5 |
| MINCHO-W5 | 30 | 12 | 200 | 54 | 50 | 2.5 |
| MINCHO-W7 | 35 | 13 | 200 | 56 | 55 | 2.5 |
| GOTHIC-W1 | 20 | 20 | 230 | 55 | 50 | 1 |
| GOTHIC-W3 | 25 | 25 | 230 | 57 | 60 | 1 |
| GOTHIC-W5 | 30 | 30 | 235 | 59 | 70 | 1 |
| GOTHIC-W7 | 35 | 35 | 235 | 60 | 80 | 1 |
| ⋮ | ⋮ | ⋮ | ⋮ | ⋮ | ⋮ | ⋮ |

FIG. 9

| TYPEFACE NAME | SQUARED DISTANCE | SIMILARITY ORDER |
|---|---|---|
| MINCHO-W1 | 27576 | 3 |
| MINCHO-W3 | 12256 | 2 |
| MINCHO-W5 | 3064 | 1 |
| GOTHIC-W5 | 50769 | 4 |
| GOTHIC-W7 | 74281 | 5 |

FIG. 10(a)

| ENCODING NAME | SUBSTITUTE ENCODING INFORMATION STORAGE FILE |
|---|---|
| ENCODE – A | ENCODINGS/ENCODE – A |
| ENCODE – B | ENCODINGS/ENCODE – B |
| ENCODE – C | ENCODINGS/ENCODE – C |

FIG. 10(b)

| ENCODE – C SUBSTITUTE DEFINITION | | |
|---|---|---|
| CHARACTER CODE RANGE | ENCODING | CHARACTER CODE |
| 0 × 0000 – 0 × 00FF | ENCODE – A | 0 × 0000 – 0 × 00FF |
| 0 × 1000 – 0 × 2120 | ENCODE – B | 0 × 8140 – 0 × 9260 |
| 0 × 2121 – 0 × FFFF | ENCODE – A | 0 × 2121 – 0 × FFFF |

FIG. 11

| CHARACTER CODE | ESCAPEMENT AT 1000 POINT |
|---|---|
| 0 × 0000 | 240 |
| 0 × 0001 | 240 |
| 0 × 0002 | 500 |
| 0 × 0003 | 500 |
| ⋮ | ⋮ |
| 0 × 2121 – 0 × FFFF | 1000 |

FIG. 12

| CHARACTER CODE RANGE | SUBSTITUTE FONT NAME | CHARACTER CODE | VERTICAL STEM DIFFERENCE | HORIZONTAL STEM DIFFERENCE |
|---|---|---|---|---|
| 0×0000 – 0×00FF | MINCHO – M3 | 0×0000 – 0×00FF | +10 | +0 |
| 0×1000 – 0×2120 | MINCHO – B6 | 0×8140 – 0×9260 | +5 | +0 |
| 0×2120 – 0×FFFF | MINCHO – M3 | 0×2120 – 0×FFFF | +10 | +0 |

| CHARACTER CODE | ESCAPEMENT AT 1000 POINT |
|---|---|
| 0×0000 | 240 |
| 0×0001 | 240 |
| 0×0002 | 500 |
| 0×0003 | 500 |
| ............ | ............ |
| 0×2121 – 0×FFFF | 1000 |

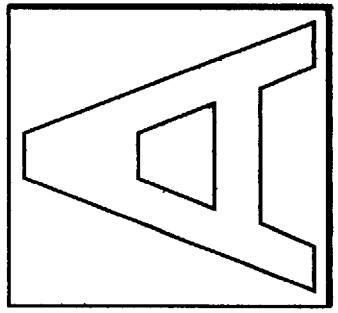
FIG. 14(a) SUBSTITUTE CHARACTER
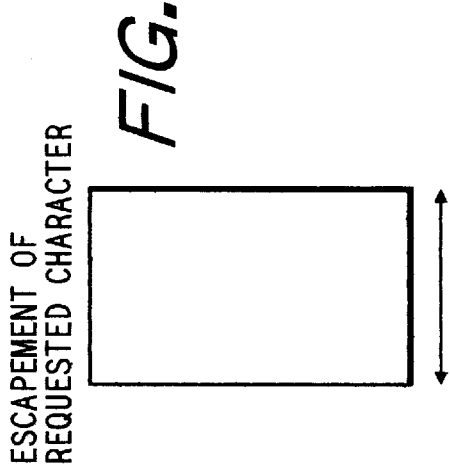
FIG. 14(b) ESCAPEMENT OF REQUESTED CHARACTER
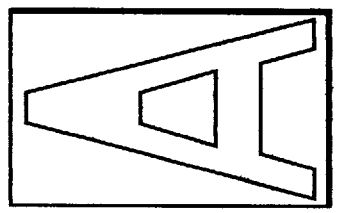
FIG. 14(c) SUBSTITUTE CHARACTER DEFORMED TO ESCAPEMENT OF REQUESTED CHARACTER

CHARACTER OUTPUT DEVICE

BACKGROUND OF THE INVENTION

1. Field of the Invention

The present invention relates to a character output device which has a font substitute function when the character output device accepts an output requested font and also when the same font as the output requested font is not held in hold means for holding a plurality of loaded fonts, to substitute the optimum substitute font similar to the output requested font for the output requested font, and also performs a document output processing using the substitute font.

2. Description of the Related Art

Recently, documents that can be composed by a document edit device as a client device have been diversified in kind, while the number of usable fonts have also increased greatly.

On the other hand, in a character output device such as a printer or the like, which outputs a document made up by the document edit device, there have been loaded a large number of fonts in correspondence to the diversified document edit function of the document edit device.

However, since the fonts to be treated on the client side are not the same as the fonts to be used on the character output device side, even if their typeface designs seemingly resemble each other, it is not possible to establish the correspondence of the client side fonts to the character output device side fonts and, therefore, even if the client side requests the character output device side to print and output the fonts used on the client side as they are, generally, the character output device side cannot print and output such fonts.

In order to solve this problem, for example, in a system employing the "MS-Windows 3.1" by Microsoft Corporation, a table is provided which shows the correspondence of client side fonts to printer side fonts, font substitute can be specified. On the other hand, it is also possible to select another method in which the font substitute is not executed on the client side, but the fonts are converted to raster data or outline data and the printer side uses the converted data to print and output the fonts.

In a system employing the "Macintosh" by Apple Corporation, an inquiry is made as to whether fonts used on the client side can be used on the printer side or not and, based on the results of this inquiry, only the usable fonts are requested from the printer side. Here, the unusable fonts are converted to raster data on the client aide and the converted raster data are transmitted to the printer side so that they can be printed and output.

Also, in a system disclosed in Japanese Patent Unexamined Publication No. Sho. 60-80895, the client side specifies the attributes of fonts to be requested from the printer side for output, while the printer side uses the specified attributes to thereby select the fonts that are most approximate to the specified attributes.

Further, in a system disclosed in Japanese Patent Unexamined Publication No. Hei. 6-59851, the client side inquires of a process system side holding fonts as to the attributes of the fonts and, on the base of the results of this inquiry, the client side selects the fonts to be used.

Still further, in Japanese Patent Unexamined Publication No. Sho. 62-208091, there are disclosed an information output device which refers to a select table for controlling the attributes of fonts to compare the attribute of a font requested for output with the attribute of an outputtable font, selects the font that has the same attribute of the requested font or is most approximate in the attribute to the requested font, and determines the amount of feed of the font in accordance with the attribute of the font selected; and, an information output device which reads out the attributes of fonts from a font memory loaded into the information output device and controls the read-out attributes.

However, in the system employing the "MS-Windows 3.1", when the font load condition varies on the printer side, the client side is not able to cope with such variation in the font load condition of the printer side.

Also, in the system employing the "Macintosh", whenever the printer does not carry on board the same fonts as the client device, it is necessary that the fonts are converted to the raster data and the thus converted raster data are transmitted to the printer side.

Further, in the system disclosed in Japanese Patent Unexamined Publication No. Sho. 60-80895, it is necessary for the client side to obtain the attributes of the fonts to be requested for output by the client side. However, in normal client devices, it is difficult to find other information than the font identifiers of fonts being used by a simple processing and, therefore, a procedure processing to specify the attributes of the fonts to the printer side is complicated.

Still further, in the system disclosed in Japanese Patent Unexamined Publication No. Hei. 6-59851, it is necessary for the client side to make a great change for a processing to inquire of the processing system side that holds the fonts.

SUMMARY OF THE INVENTION

In view of this, the present invention aims at eliminating the drawbacks found in the above-mentioned conventional systems. Accordingly, it is an object of the invention to provide a character output device which, even when the client side requests the printer side to output the fonts that are used on the client side as they are, can automatically select and combine the optimum fonts as the substitute fonts for the output requested fonts, can substitute the thus automatically selected and combined fonts for the output requested fonts and can output documents using the substitute fonts.

Also, it is another object of the invention to provide a character output device which can automatically replace the expressions of fonts being used on the client side by the fonts that have been reproduced at high levels without increasing the amount and types of transmission data from the client side to the printer side, and can output the documents that are requested for output by the client side by use of the thus automatically replaced or substituted fonts.

In attaining the above object, according to the first aspect of the invention, there is provided a character output device, responsive to a request for use of a font, for selecting a desired font out of a plurality of fonts available for rendering and outputting a character using the thus selected font, the character output device comprising: first extract means for extracting a first font attribute from a font identifier of the font requested for use; second extract means for extracting a second font attribute from a font identifier of the available fonts loaded on board the printer; select means, when the font requested for use is present in the available fonts, for selecting the font and, when not present, for comparing the first font attribute extracted by the first extract means with the second font attribute extracted by the second extract means to thereby calculate a similarity between the first and second font attributes, and for selecting a substitute font in accordance with the calculated similarity; and character output means for outputting a character in accordance with a font selected by the select means.

According to the second aspect of the invention, there is provided a print system having a font substitute function to accept an output requested font and, when the same font as the output requested font is not held in hold means for holding a plurality of available fonts, to substitute an optimum substitute font similar to the output requested font for the output requested font, and comprising a character output device for performing a document output processing using the substitute font and a client device for making an output request of the character output device, wherein the client device includes a font name list showing correspondence between font names of fonts loaded on board the client device and font names of fonts loaded on board the character output device, and the client device, when it requests the character output device to output a document made up by itself using the fonts loaded on board itself, requests the character output device to output the document using the font names of the fonts loaded on board the character output device.

According to the third aspect of the invention, there is provided a print system having a font substitute function to accept an output requested font and, when the same font as the output requested font is not held in hold means for holding a plurality of available fonts, to substitute an optimum substitute font similar to the output requested font for the output requested font, and comprising a character output device for performing a document output processing using the substitute font and a client device for making an output request of the character output device, wherein the character output device includes font presence confirm means which, when the character output device accepts a request for an inquiry about confirmation of presence of a font, and also when it finds that the font is present in the available fonts or that the font can be a font substituted by the font substitute function, confirms that the font is present, and then informs the client device of a confirmation result.

According to the fourth aspect of the invention, there is provided a print system having a font substitute function to accept an output requested font and, when the same font as the output requested font is not held in hold means for holding a plurality of available fonts, to substitute an optimum substitute font similar to the output requested font for the output requested font, and comprising a character output device for performing a document output processing using the substitute font and a client device for making an output request of the character output device, wherein the character output device includes usable font output means which, when the character output device accepts a request for a usable font list, finds font names of not only the available fonts but also the fonts that can be substituted by the font substitute function, and informs the client device of a list of the font names found.

BRIEF DESCRIPTION OF THE DRAWINGS

FIG. 4 is a flow chart of a procedure for a processing to select in a substitute typeface in Step 104;

FIG. 5 is a flow chart of a procedure for a processing to obtain a substitute font list in Step 108;

FIG. 6 is a view of the concrete contents of a loaded font list;

FIG. 7 is a view of the concrete contents of a font attribute data base;

FIG. 8 is a view of the concrete contents of a typeface attribute data base;

FIG. 9 is a view of squared distance calculation results between a requested typeface and a loaded typeface as well as similarity orders based on the distance calculation results;

FIGS. 10(a) and 10(b) are views of the concrete contents of a substitute encoding data base;

FIG. 11 is a view of the metrics information of "Mincho-8";

FIG. 12 is a view of the definition contents of substitute fonts;

FIGS. 14(a) to 14(c) are explanatory views of the idea of a metrics adjust processing;

DETAILED DESCRIPTION OF THE PREFERRED EMBODIMENT

Now, description will be given below of a preferred embodiment of a character output device according to the invention.

Figure 2:
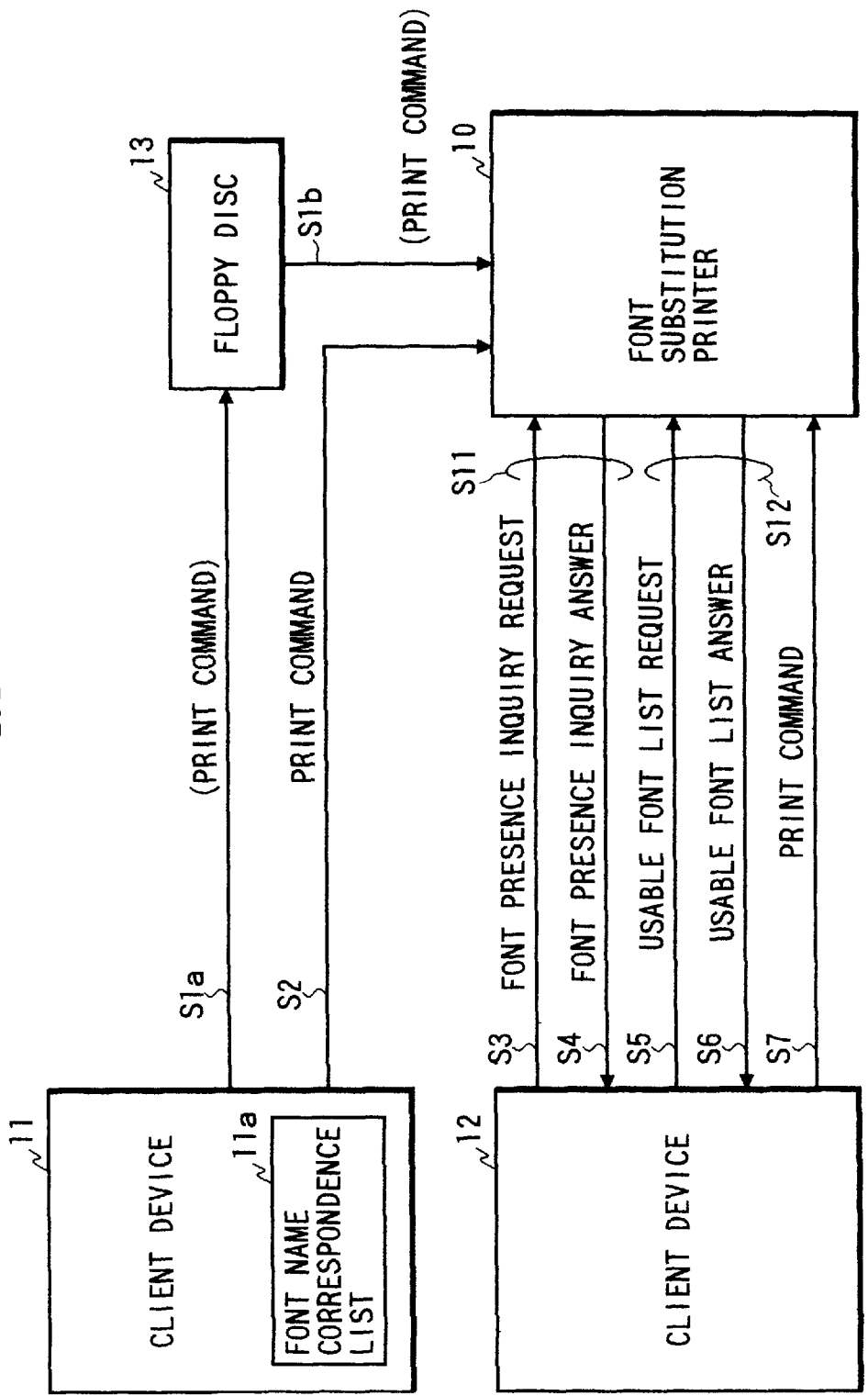
FIG. 2 is a block diagram of a print system including the font substitution printer according to the embodiment of the invention.

At first, FIG. 2 is a block diagram of a print system including a font substitution printer 10 which is an embodiment of the invention. In FIG. 2, the print system includes the font substitution printer 10 and two client devices 11 and 12 respectively connected to the font substitution printer 10.

The two client devices 11 and 12 are respectively connected to the font substitution printer 10 through lines provided in a network (not shown) or the like. The client device 11 is able to use the font substitution printer off line through a floppy disc 13 serving as an external storage medium.

The client device 11 is a device which does not request the font substitution printer 10 for confirmation of usable fonts, whereas the client device 12 is a device which requests the font substitution printer 10 to confirm the usable fonts. Here, the usable fonts include not only the loaded fonts (or device fonts) that the font substitution printer 10 has previously held but also substitute fonts used as alternate or substitute fonts approximate to fonts requested for use (which will be hereinafter referred to as requested fonts) when the loaded fonts are used. How to generate the substitute fonts will be described later.

The client device 11 includes a font name correspondence list 11a which is a list of the usable fonts of the font substitution printer 10 and issues to the font substitution printer 10 a print command which includes the specification of the usable fonts with reference to the font name correspondence list 11a.

On the other hand, the client device 12 inquires of the font substitution printer 10 as to the usable fonts by means of two methods and issues a print command to the font substitution printer 10 based printer 10 based on the result of this inquiry.

In the first method, the client device 12 inquires of the font substitution printer 10 as to the presence of the requested fonts individually and, based on the inquiry results, that is, based on the results of the confirmation of the presence of the requested fonts, the client device 12 issues a print command to the font substitution printer 10.

In the second method, the client device 12 requests the list of the usable fonts of the font substitution printer 10, confirm the presence of the requested fonts with reference to the usable fonts list and, in accordance with the results of the confirmation of the presence of the requested fonts, issues a print command to the font substitution printer 10.

Here, the print system shown in FIG. 2 is a system which relates to a postscript process system. In the postscript process system, raster data which are the images of output paper are created by executing a program. That is, processings such as to draw a line, to shade a character, to use a font, to determine the size of a character, to draw a specified character, and the like are instructed by given operators (process commands).

In the postscript process system, generally, a character drawing process is carried out according to the following procedure. That is:

1) A font is specified to a "findfont" operator to obtain a font dictionary.
2) A character size is specified to the thus obtained font dictionary.
3) Use of the font dictionary is declared.
4) A character code is specified to draw a picture.

The "findfont" operator is an operator which finds out font data coincident with the specified font name out of font data loaded on board the font substitution printer 10 and converts the font data into a usable form from a program as a font dictionary. The thus obtained font dictionary makes it possible to use the shape data on the respective characters of fonts.

In particular, as an example to obtain a font dictionary in the postscript process system, there is known /Ryumin-Light-83pv-RKSJ-H findfont, that is, "50 scalefont setfont" of /Ryumin-Light-83pv-RKSJ-H findfont 50 scalefont setfont is used to specify a character size as 12 points and also to declare the specifications of the font.

Further, in this state, by setting "<889F> show", to show a Chinese character "咜" corresponding to a character code "889F" is instructed.

Here, a font corresponding to a font name "Ryumin-Light-83pv-RKSJ-H" specified by "findfont" is not synonymous with a so-called typeface or writing style. A font means a data unit which uses a specific typeface and has a specific metrics of a specific encoding. That is, a font is composed of a typeface expressing a character design, a character encoding representing the correspondence between character codes and character masks, and a character metrics represented by a character feed direction. Therefore, the above-mentioned "Ryumin-Light-83pv-RKSJ-H" specifies uniquely a font in which a typeface is "Ryumin L-KL" specified by "Ryumin-Light", a character encoding is "Macintosh-system Romaji Kana Shift JIS" specified by "83pv-RKSJ", and a character feed direction constituting an element of a character metrics is "Horizontal writing".

As described above, on the assumption that the font is specified uniquely by means of a typeface, an encoding and a metrics, description will be given below of the structure and operation of the font substitution printer 10.

At first, the structure of the font substitution printer 10 will be described.

Figure 1:
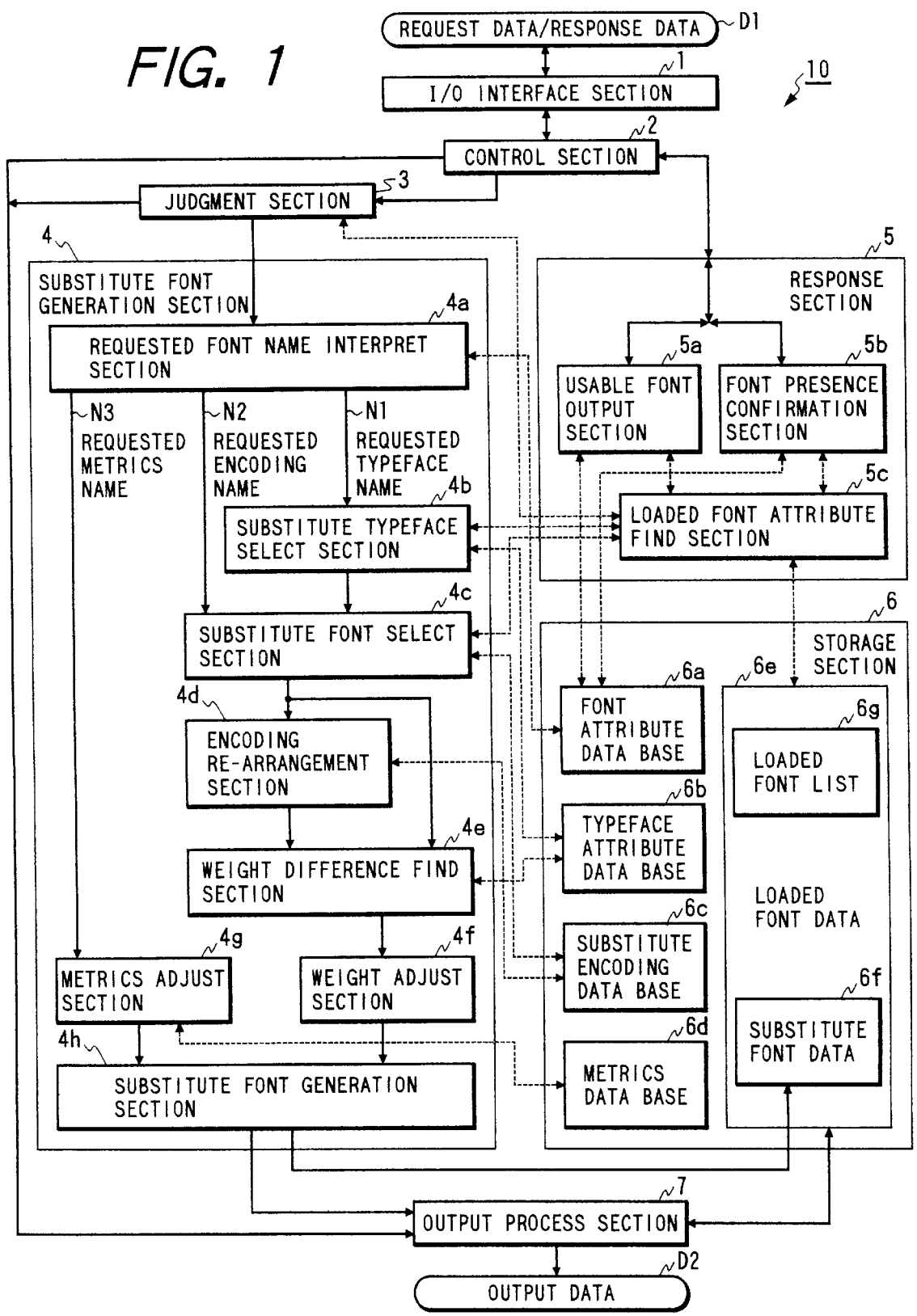
FIG. 1 is a block diagram of the structure of a font substitution printer according to an embodiment of the invention.

FIG. 1 is a block diagram of the structure of the font substitution printer which is an embodiment of the invention. In FIG. 1, the font substitution printer 10 includes an input/output interface section 1, a control section 2, a judgment section 3, a substitute font generation section 4, a response section 5, a storage section 6, and an output process section 7.

The input/output interface section 1 not only accepts a request command for output of a document from the client devices 11, 12 and the like and outputs the request command to the control section 2 but also outputs to the requesting devices response data such as a list of the usable fonts that the control section 2 have accepted from the response section 5 and the like.

The control section 2, when the request command it has accepted is a request command for document output, instructs the output process section 7 to process the request command and, when the request command is a command for specification of a requested font, outputs the request command to the judgment section 3 and, if necessary, allows it to generate a substitute font for the requested font.

The judgment section 3 judges whether the requested font is loaded on board the storage section 6 or not. If loaded, then the judgment section 3 notifies the output process section 7 of the loaded font, or if not loaded, then it generates a substitute font which is approximate to the requested font and substitutes for the requested font.

The storage section 6 includes not only loaded font data 6e but also a font attribute data base 6a, a typeface attribute data base 6b, a substitute encoding data base 6c, a metrics data base 6d and the like. The font attribute data base 6a is a data base which shows the correspondence of font names to font attributes. The typeface attribute data base 6b is a data base which connects the kinds of typefaces with multi-dimensional parameters to represent the kinds of typefaces. The substitute encoding data base 6c is a data base which expresses encoding kinds by other encoding kinds. Also, the loaded font data 6e contains therein a loaded font list 6g which is a list of the font names of the loaded fonts.

The substitute font generation section 4, in accordance with the typeface name of a requested font, the encoding name thereof, and the metrics name thereof, generates the optimum substitute font that is approximate to the requested font by use of loaded fonts.

A requested font name interpret section 4a of the substitute font generation section 4 interprets a requested font name to take out a typeface name N1, an encoding name N2, and a metrics name N3.

A substitute typeface select section 4b of the substitute font generation section 4 selects as a substitute typeface a typeface which is the most approximate to the requested font among the loaded fonts, based on the typeface name N1.

A substitute font select section 4c of the substitute font generation section 4, in accordance with the substitute typefaces selected in the substitute typeface select section 4b and the encoding names, creates a substitute font list consisting of combinations of the typefaces with the encodings.

A encoding re-arrangement section 4d of the substitute font generation section 4, in accordance with the information that is contained in both of the substitute font list and the encoding data base, realizes the encoding of the requested font by means of a combination of the substitute fonts.

A weight difference find section 4e of the substitute font generation section 4 finds vertical and horizontal stem width differences between the typefaces of the respective substitute fonts of the substitute font list and the requested typefaces.

A weight adjust section 4f of the substitute font generation section 4 adjusts the weight of a character in accordance with the vertical and horizontal stem width differences obtained by the weight difference find section 4e.

A metrics adjust section 4g of the substitute font generation section 4 adjusts the metrics with reference to the metrics data base 6d, in accordance with the metrics name N3 taken out by the requested font name interpret section 4a.

A substitute font create section 4h of the substitute font generation section 4 creates a substitute font which substitutes for a requested font in accordance with the information that is finally adjusted by the weight adjust section 4f and metrics adjust section 4g. This substitute font is a virtual font which is defined by the loaded font data 6e.

The response section 5, in accordance with a request from the client devices 11, 12 and the like, retrieves the presence of usable fonts according to the storage contents of the storage section 6, and sends out the retrieval results to the source of the request.

That is, the font presence confirm section 5b of the response section 5, when it accepts a font presence inquiry request from the client device 12 according to the first method, confirms the presence of the font from the font names registered in the loaded font list 6g and font attribute data base 6a, and answers the confirmation results to the client device 12 through the control section 2 and input/output interface section 1. Also, the usable font output section 5a of the response section 5, when it accepts a request for the usable font list from the client device 12 according to the second method, answers the usable font list to the client device 12 in accordance with the contents of the loaded font list 6g and font attribute data base 6a.

Next, description will be given below of the procedure for a substitute font generation process to be performed by the font substitution printer 10 with reference to flow charts respectively shown in FIGS. 3 to 5.

Figure 3:
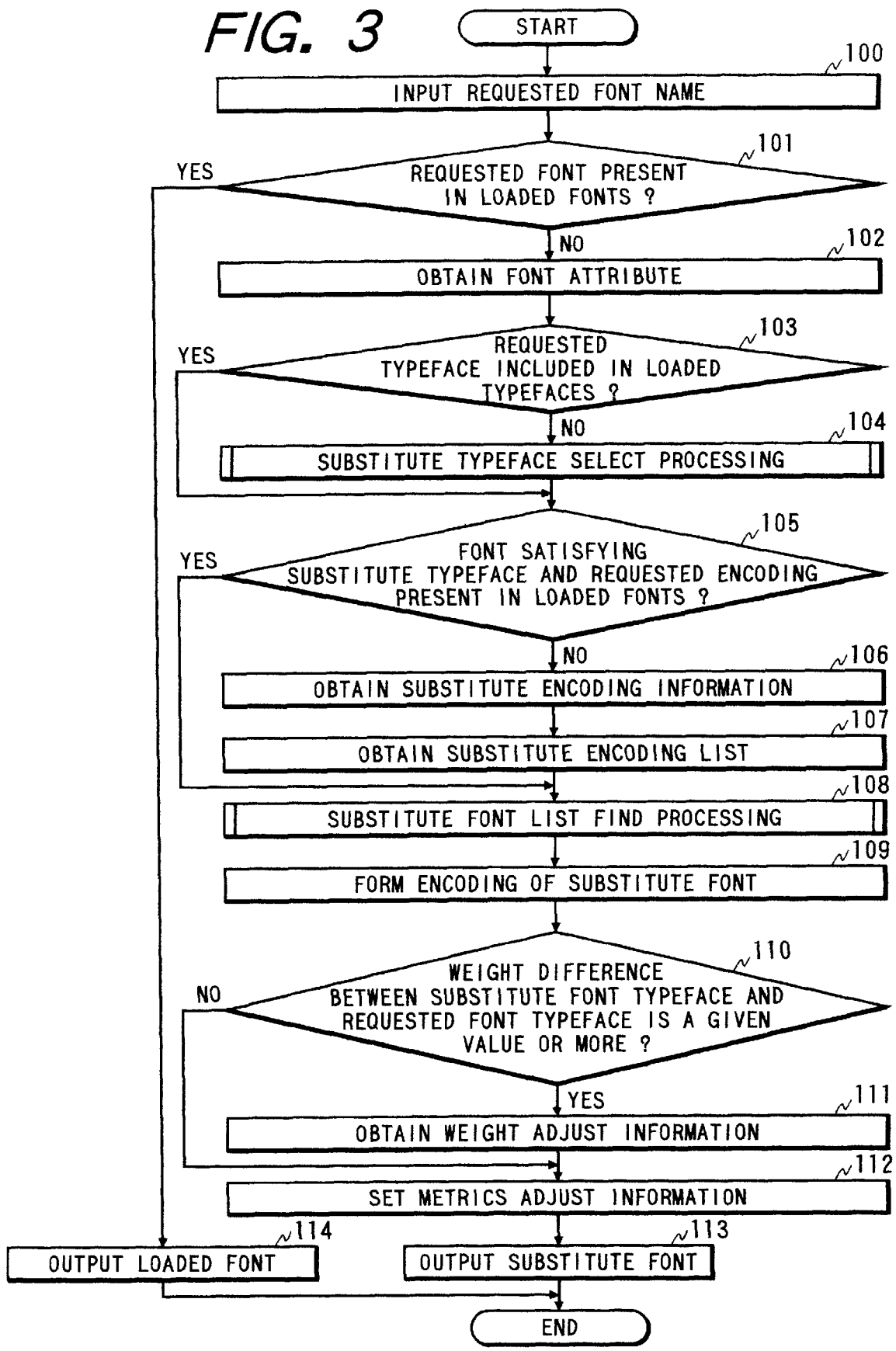
FIG. 3 is a flow chart of the whole procedure for a substitute font generate processing to be performed by the font substitution printer.

At first, FIG. 3 is a flow chart of the whole process procedure for the substitute font generation process to be carried out by the font substitution printer 10.

In FIG. 3, the input/output interface section 1 accepts an output request command input therein from the client device 11, 12, or the like and the control section 2 outputs the output request command to the output process section 7, while, if a requested font name is present within the output request command, then the control section 2 gives the present requested font name to the judgment section 3 (step 100). On accepting the present requested font name, the judgment section 3 judges according to the loaded font list whether the present output requested font is included in the loaded fonts (Step 101). In Step 101, if the judgment section 3 judges that the present output requested font is included in the loaded fonts, then the present output requested font as it is output to the output process section 7.

On the other hand, in Step 101, if the judgment section 3 judges that the present output requested font is not included in the loaded fonts, then the present output requested font is output to the requested font name interpret section 4a. On acceptance of the output requested font name, the requested font name interpret section 4a retrieves the font attribute data base 6a in accordance with the output requested font name to obtain the attributes of the output requested font, that is, the names of the typeface attribute, encoding attribute and metrics attribute (Step 102). Hereinafter, to distinguish the attributes obtained in Step 102 from the attributes of the loaded fonts, the attributes of the output requested font are respectively referred to as the requested typeface attribute, requested encoding attribute and requested metrics attribute, whereas the thus obtained attributes names are respectively referred to as the requested typeface name N1, requested encoding name N2 and requested metrics name N3. Here, the typeface name is an identifier which represents a typeface uniquely, while the typeface attribute data base 6b manages and stores the correspondence between the typeface names and typeface attributes. Also, the encoding name is an identifier which expresses a character set and the arrangement of the characters thereof uniquely, while the substitute encoding data base 6c manages and stores the re-arrangement relationship between the respective encodings and their respective substitute encodings. Further, the metrics name is an identifier which represents the escapement of the all characters contained in a font uniquely, while the metrics data base 6d manages and stores information as to the escapement of characters corresponding to the respective metrics names.

Now, the requested typeface name N1 obtained in Step 102 is given to the substitute typeface select section 4b and, responsive to this, the substitute typeface select section 4b judges whether the requested typeface represented by the requested typeface name N1 is included in the loaded typefaces or not through the loaded font attribute find section 5c (Step 103). That is, the loaded font attribute find section 5c obtains all of the loaded font names of the loaded font data 6c, and retrieves the font attribute data base 6a in accordance with the thus obtained loaded font names to thereby obtain the font attributes of all the loaded fonts. And, in Step 103, it is checked whether the same typeface name as the requested typeface name N1 is present or not in the typeface (loaded typeface) names representing the typeface attributes of all the loaded fonts thus obtained. In Step 103, if it is found that the requested typeface is included in the loaded typefaces, then the present requested typeface is selected as a substitute typeface. On the other hand, if it is found that the requested typeface is not included in the loaded typefaces, then a substitute typeface select processing to select as a substitute typeface a typeface similar to the requested typeface is performed with reference to the typeface attribute data base 6b (Step 104). Here, the substitute typeface means a loaded typeface which is used as a substitute font.

After the substitute typeface is selected in this manner, the substitute font select section 4c judges whether a loaded font not only serving as the selected substitute typeface and but also having the requested encoding name N2 given by the requested font name interpret section 4a is present or not (Step 105). This judgment in Step 105 is made by retrieving the font attribute data base 6a through the loaded font attribute find section 5c. In Step 105, if it is found that the loaded font that satisfies not only the substitute typeface but also the requested encoding is present, then the present loaded font is set as the substitute font.

On the other hand, in Step 105, if it is found that the loaded font satisfying both the substitute typeface and the requested encoding is not present, then the substitute encoding data base 6c is retrieved in accordance with a requested encoding name representing the present requested encoding to obtain a substitute encoding information which represents a relationship between the present requested encoding and other encodings to substitute for the present requested encoding by means of combination thereof (Step 106). By obtaining the substitute encoding information, there can be obtained a substitute encoding list which represents one or more substitute encoding names to substitute for the present requested encoding (Step 107). And, in accordance with the one or more substitute encoding names, there is carried out a processing for obtaining a substitute font list which is used to obtain one or more loaded fonts (substitute fonts) necessary for generation of a substitute font (Step 108).

And, the substitute fonts in the substitute font list obtained in Step 108 are used to form the encoding of the substitute font (Step 109). As a result of this, there is obtained a substitute font which not only has a loaded typeface coincident with or similar to the requested typeface of the requested font but also satisfies the requested encoding, that is, a provisional substitute font which satisfies the other remaining requested font attributes than the requested metrics.

After then, when the provisional substitute font uses a typeface which is similar to but different from the selected loaded typeface, in order to make the provisional font to approach the requested font further, there is executed a processing which adjusts the weight of the loaded typeface forming the provisional substitute font.

That is, the weight difference find section 4e finds a weight difference between the requested typeface and the alternate typefaces of one or more alternate fonts forming the provisional substitute font obtained through the encoding re-arrangement section 4d with reference to the typeface attribute data base, and judges whether the weight difference is more than a given reference value or not (Step 110). This weight difference is a difference between the vertical and horizontal stem widths of a character.

In Step 110, if it is found that the weight difference is within a given range, then the weight adjust section 4f does not set any information for weight adjustment. On the other hand, if it is found the weight difference is out of the given range, then the weight adjust section 4f sets some information necessary to adjust the weight by the respective substitute typefaces (Step 111).

After setting of the information necessary for the weight adjustment, the metrics adjust section 4g, in accordance with the requested metrics name that is given by the requested font name interpret section 4a, retrieves the metrics data base 6d to set metrics information by the respective substitute fonts (Step 112).

And, the substitute font create section 4h sets information on a substitute font coincident with or similar to the requested font as one piece of substitute font data, stores the thus set substitute font data 6f in the storage section 6, and gives the substitute font name (virtual requested font name) to the output process section 7.

After then, the output process section 7, in accordance with a process command to be given later from the control section 2, carries out a desired document output processing using the generated substitute font, and the output processed raster data are output as the output data D2 and are then printed.

Next, description will be given below of the substitute typeface select processing to be performed in Step 104 with reference to a flow chart shown in FIG. 4.

At first, if the requested typeface name N1 is input into the substitute typeface select section 4b(Step 201), then the substitute typeface select section 4b retrieves the typeface attribute data base 6b in accordance with this requested typeface name N1 to obtain a typeface attribute represented by the requested typeface name N1 (Step 202). This typeface attribute includes the width of a vertical stem, the width of a horizontal stem, the width of the bosom, a bounding box rate, a black spot rate, and a scale rate. Of course, the typeface attribute is not limited to them.

Here, while description will be given later of the concrete examples of these typeface attributes, the vertical stem width represents the mean value of values obtained by measuring the widths of specific vertical stems respectively included in a specific number of characters and the horizontal stem width expresses the mean value of values obtained by measuring the widths of specific horizontal stems respectively included in a specific number of characters. Also, the width of the bosom stands for the mean value of values obtained by measuring the widths of the specific positions referred to as the bosoms of a specific number of characters. The bounding box rate represents the mean value of the rates of bounding boxes (least circumscribed rectangles) to character areas in a specific number of characters. The black spot rate expresses the mean value of the rates of dark shadings to character areas in a specific number of characters. The scale rate represents the mean value of rates between the scale portions and stem portions of a specific number of characters at the specific positions thereof.

Here, the term "stem", generally, means vertical and horizontal strokes among elements which form a character. In a font of a Gothic type, the vertical and horizontal stems are substantially equal in width to each other and, in a font of a Ming type, the horizontal stem is narrow in width and the vertical stem is wide in width. Also, in a font of a Gothic type, when a weight increases, the vertical and horizontal stems increase in width at a given rate, whereas a font of a Ming type shows a tendency that the width of the horizontal stem little varies and only the width of the vertical stem increases.

Also, the term "bosom" means, for example, in a Chinese character "冂", the outer enclosure thereof shown by first and second strokes or the position relationship of the "丨丨" portion thereof in design. For instance, when the "丨丨" portion of the character "冂" is large or wide, then it is said that the bosom is wide; and, when the outer enclosure or the "丨丨" portion is small or narrow, then the bosom is said to be narrow. When the bosom of a character is narrow, then the character is apt to provide a hard image in terms of typeface design; and, on the other hand, when the bosom is wide, then the character is apt to provide a soft image.

Further, the term "scale" represents the design of the right end portion of the horizontal stem of a character of a Ming type, that is, the design of the right end portion that is swelling upwardly in a triangular shape. Generally, such scale is not found in a character of a Gothic type or the like.

Now, after the typeface attributes of the requested typeface are obtained in Step 201, the substitute typeface select section 4b obtains a loaded font list showing the font names of all the loaded fonts through the loaded font attribute find section 5c(Step 202).

And, the substitute typeface select section 4b selects one loaded font out of the loaded font list obtained in Step 202 (Step 203), and obtains the typeface attribute of the selected loaded font from the typeface attribute data base 6b (Step 204). After then, using the attribute values of the typeface attribute of the requested typeface obtained in Step 201 and the typeface attribute of the loaded font obtained in Step 204, the substitute typeface select section 4b calculates a distance between the requested typeface and loaded typeface (Step 205). And, by use of the distance calculation result in Step 205, the substitute typeface select section 4b determines a similarity order (an approximate order) between the requested typeface and loaded typeface (Step 206). After then, it is checked whether any unselected loaded font is present in the loaded font list or not. If present, then the processing moves to Step 203, in which one of the remaining loaded fonts is selected, similarly to the above case, a distance between the requested typeface and the loaded typeface is calculated, and a similarity order is determined and updated for each of the loaded typefaces.

Here, the distance D between the requested typeface and loaded typeface in Step 205 is calculated according to the following equation: That is, $$D=(U(A-a))^2+(V(B-b))^2+(W(C-c))^2+(X(D-d))^2+(Y(E-e))^2+(Z(F-f))^2.$$

Here, "^" expresses a power method, and A to F respectively express the vertical stem width, horizontal stem width, counter, bounding box rate, black spot rate and scale ratio of the requested typeface. Also, a to f respectively express the vertical stem width, horizontal stem width, counter, bounding box rate, black spot rate and scale ratio of the loaded typeface selected. Further, U to X respectively express the weight coefficients of the vertical stem width, horizontal stem width, counter, bounding box rate, black spot rate and scale ratio.

Now, in Step 206, if all similarity orders in accordance with the distance calculation results between the requested type face and loaded typefaces are determined, then the substitute typeface select section 4b selects, as a substitute typeface, the loaded typeface that is the highest in the similarity order, namely, the loaded typeface that is most similar to the requested typeface (Step 208), outputs the thus selected substitute typeface (Step 209), and returns to Step 104.

Next, description will be given below of a procedure for the substitute font list obtaining processing to be performed in Step 108 with reference to a flow chart shown in FIG. 5.

At first, due to input of a substitute encoding list (Step 300), the substitute font select section 4c obtains the encoding names of the respective substitute encodings in the substitute encoding list (Step 301). Here, the substitute encoding list consists of a plurality of encoding lists which respectively satisfy a character set represented by the requested encoding.

And, the substitute font select section 4c sets a substitute typeface, which is selected as the highest similarity order substitute typeface by the substitute typeface select section 4b, as a first candidate substitute typeface (Step 302). After then, the substitute font select section 4c judges whether a font to satisfy not only the substitute typeface but also the encoding set in Step 302 is present as a loaded font or not (Step 303). Here, if it is fount that a font to satisfy both of the substitute typeface and encoding is not present as a loaded font, then a substitute typeface having the second highest similarity order is set again as a substitute typeface (Step 304), and the judgment processing in Step 303 is executed repeatedly.

If a font to satisfy both of the substitute typeface and encoding is found present as a loaded font, then the loaded font is registered in the substitute font list (Stop 305).

After then, the substitute font select section 4c judges whether any other encoding is present in the substitute encoding list or not (Step 306). If any other encoding is found present, then the substitute font select section 4c moves to Step 301, in which it obtains the present other encoding from the substitute encoding list and then performs the above-mentioned substitute font setting and registering proceedings repeatedly. On the other hand, if substitute fonts corresponding to all the substitute encodings are set and registered in Step 306, then the substitute font select section 4c outputs the combinations of these substitute fonts as a substitute font list (Step 307), and then returns to Step 106.

Next, description will be given below in detail of the substitute font generating processing to be carried out by the font substitution printer 10.

At first, let us assume a case in which a print command specifying a font name "Mincho-H8" is input into the font substitution printer 10 from the client device 11, 12 or the like. And, as for the loaded fonts, like a loaded font list shown in FIG. 6, it is assumed that there are stored five loaded fonts, that is, "Mincho-L2", "Mincho-M3", "Mincho-B6", "Gothic-B6" and "Gothic-H8". Here, "Mincho" means Ming type.

Also, in the font attribute data base 6a, there are stored the typeface names, encoding names and metrics names that respectively correspond to font names shown in FIG. 7. Here, other font names than the font names included in the loaded font list shown in FIG. 6 are the font names that are used by the client devices 11, 12 and the like, that is, they are the font names that are not loaded in the font substitution printer 10. More particularly, in the font attribute data base 6a, there are stored all the font attributes that are used by the print system. Also, in FIG. 7, the typeface attributes of the loaded fonts are respectively enclosed by bold lines.

Further, in the typeface attribute data base 6b, there are stored the typeface attributes of typefaces which are represented by the respective typeface names of the font names stored in the font attribute data base 6a; and, as the typeface attributes include a vertical stem width, a horizontal stem width, a counter, a bounding box rate, a black spot rate, and a serif rate, and the attribute values of the respective typeface attributes are stored in the typeface attribute data base 6b. The term "serif rate", which includes a scale, represents an ornamentation rate in typeface design such as putting-of-brush, sweep-up, that is, it represents the degree of ornamentation such as a scale and the like in the noteworthy portions of a specific number of characters. Similarly to FIG. 6, the typeface attributes of the loaded fonts are enclosed by bold lines.

Now, if a print command specifying the above-mentioned font name "Mincho-H8" is input into the font substitution printer 10, then the judgment section 3 of the font substitution printer 10 refers to the loaded font list 6g and judges that a loaded font having the font name "Mincho-H8" of the requested font specified is not present, so that the "Mincho-H8" is input into the substitute font generation section 4 of the font substitution printer 10. That is, the requested font name "Mincho-H8" is input into the requested font name interpret section 4a. Responsive to this, the requested font name interpret section 4a retrieves the font attribute data base 6a and obtains the typeface name (requested typeface name) "Mincho-W7" , encoding name (requested encoding name) "Encode-C", and metrics name (requested metrics name) "Mincho-8" of the requested font name "Mincho-H8". Here, "Mincholl" means Ming type.

And, in accordance with the requested typeface name "Mincho-W7", the substitute typeface select section 4b retrieves the typeface attribute data base 6b to obtain the respective typeface attributes of the requested typeface name "Mincho-W7". That is, the substitute typeface select section 4b obtains the vertical stem width "35", horizontal stem width "13", counter "200", bounding box rate "56", black spot rate "55", and serif rate "2.5".

Also, the substitute typeface select section 4b obtains the typeface attributes of the five loaded fonts shown in FIG. 6 from the typeface attribute data base 6b.

Next, the substitute typeface select section 4b applies the attribute values of the typeface attributes of the requested typeface and the attribute values of the typeface attributes of the five loaded fonts to the equation of the distance D, calculates (square) distances between the requested typeface and the respective loaded font typefaces as shown in FIG. 9, and thereby determines similarity orders based on the thus obtained squared distances. From this result, it is found that the loaded typeface most similar to the requested typeface "Mincho-W7" is the loaded typeface "Mincho-W5" and the loaded typeface second most similar to the requested typeface "Mincho-W7" is the loaded typeface "Mincho-W3". That is, the five loaded typefaces are respectively set as five substitute typefaces each having a similarity order.

After then, the substitute font select section 4c obtains a requested encoding name "Encode-C" of "Mincho-H8" given from the requested font name interpret section 4a. However, since there is not present such a loaded font that has not only the typeface of the substitute typeface "Mincho-W5" having a similarity order "1" but also the encoding name "Encode-C", the substitute font select section 4c retrieves the substitute encoding data base 6c.

Here, FIGS. 10(a) and 10(b) are views of the concrete contents of the substitute encoding data base 6c. In particular, FIG. 10(a) shows a relationship between encoding names and files in which the substitute encodings of encodings represented by the present encoding names, while FIG. 10(b) shows an example of substitute encoding information as to how the present encodings are replaced by other encodings, that is, here, FIG. 10(b) shows the substitute encoding information as the encoding name "Encode-C".

Therefore, if the substitute font select section 4c retrieves the substitute encoding data base 6c in order to obtain a substitute encoding for the encoding name "Encode-C", then it can obtain such substitute encoding information as shown in FIG. 10(b). That is, an encoding equivalent to the encoding name "Encode-C" can be obtained by combining part of an encoding having an encoding name "Encode-A" with part of an encoding having an encoding name "Encode-B".

After then, the substitute font select section 4c retrieves the font attribute data base 6b to find a loaded font having not only the substitute typeface "Mincho-W5" but also the substitute encoding "Encode-A" out of loaded fonts shown in a loaded font list.

However, since such a loaded font that satisfies both the substitute typeface "Mincho-W5" and the substitute encoding "Encode-A" is not present in the loaded fonts, the substitute font select section 4c retrieves whether there is present or not such a loaded font having a similarity order "2", that satisfies both the substitute typeface "Mincho-W3" and the substitute encoding "Encode-A".

Here, as shown in FIG. 7, since a loaded font "Mincho-M3" is present as the loaded font that satisfies both the substitute typeface "Mincho-W3" and the substitute encoding "Encode-A", this loaded font "Mincho-M3"is registered into the substitute font list as a substitute font.

Similarly, the substitute font select section 4c retrieves the font attribute data base 6a to find whether there is present such a loaded font having a similarity order "1" that satisfies both the substitute typeface "Mincho-W5" and the substitute encoding "Encode-B".

In this case, since a loaded font "Mincho-M6" is present as the loaded font that satisfies both the substitute typeface "Mincho-W5" and the substitute encoding "Encode-B", this loaded font "Mincho-M6" is registered into the substitute font list as a substitute font.

And, the substitute encoding re-arrangement section 4d creates substitute font encodings based on the substitute font list. That is, the section 4d creates the encodings of such substitute fonts as satisfy the following contents:

| Character Code Range | Substitute Font Name | Corresponding Character Code of Substitute Font |
| --- | --- | --- |
| 0000-00FF | Mincho-M3 | 0000-00FF |
| 0100-2120 | Mincho-B6 | 8140-9260 |
| 2121-FFFF | Mincho-M3 | 2121-FFFF |

After then, the weight difference find section 4e obtains a stem width difference between the substitute font and requested font from the typeface attribute data base shown in FIG. 8. That is, the weight difference find section 4e obtains a vertical stem width difference and a horizontal width difference between the substitute typeface "Mincho-W3" of the substitute font "Mincho-K3" and the requested typeface "Mincho-W7" of the requested font "Mincho-H8", and, further, obtains a vertical stem width difference and a horizontal width difference between the substitute typeface "Mincho-W5" of the substitute font "Mincho-B6" and the requested typeface "Mincho-W7" of the requested font "Mincho-H8".

And, the weight adjust section 4f, when the stem width difference between the substitute typeface and requested typeface is equal to or more than a given reference value, here, the absolute value of the stem width difference is 5 or more, is set such that it performs a weight adjust processing. In this case, since the vertical stem width difference between the substitute typeface "Mincho-W3" and the requested typeface "Mincho-W7" is +10, the weight adjust section 4f is set such that it carries out the weight adjustment of the vertical stem width and, on the other hand, since the horizontal stem width difference is +2, weight adjust section 4f is set such that it executes the weight adjustment of the horizontal stem width.

Also, because the vertical stem width difference between the substitute typeface "Mincho-W5" and the requested typeface "Mincho-W7" is +5, the weight adjust section 4f is set such that it makes the weight adjustment of the vertical stem width, whereas it is set such that it does not make any weight adjustment of the horizontal stem width since the horizontal stem width difference is +1.

On the other hand, the metrics adjust section 4g retrieves the metrics data base 6d in accordance with the requested metrics name "Mincho-8" given from the requested font name interpret section 4a to obtain the metrics information as to the requested metrics name "Mincho-8" shown in FIG. 11. In the present metrics information, for each of characters, there is shown an escapement when 1000 point. This makes it possible to determine the escapements of the respective characters. However, when no metrics information is present, the escapements of the respective substitute fonts are used as they are.

After then, the substitute font create section 4h defines substitute fonts shown in FIG. 12 in accordance with the information as to the combinations of the substitute encodings of the substitute fonts obtained by the encoding re-arrangement section 4d, the weight setting information obtained by the weight adjust section 4f, and the metrics information obtained by the metrics adjust section 4g; the substitute font create section 4h, in accordance with the thus defined substitute fonts, creates substitute font data 6f in which a pointer and the like capable of obtaining the loaded font data are set, and stores the thus created substitute font data 6f into the storage section 6; and, after then, it outputs the substitute font name (requested font name) to the output process section 7.

Now, description will be given here of the idea of the weight adjust processing set by the weight adjust section 4f as well as the idea of the metrics adjust processing set by the metrics adjust section 4g.

Figure 13:
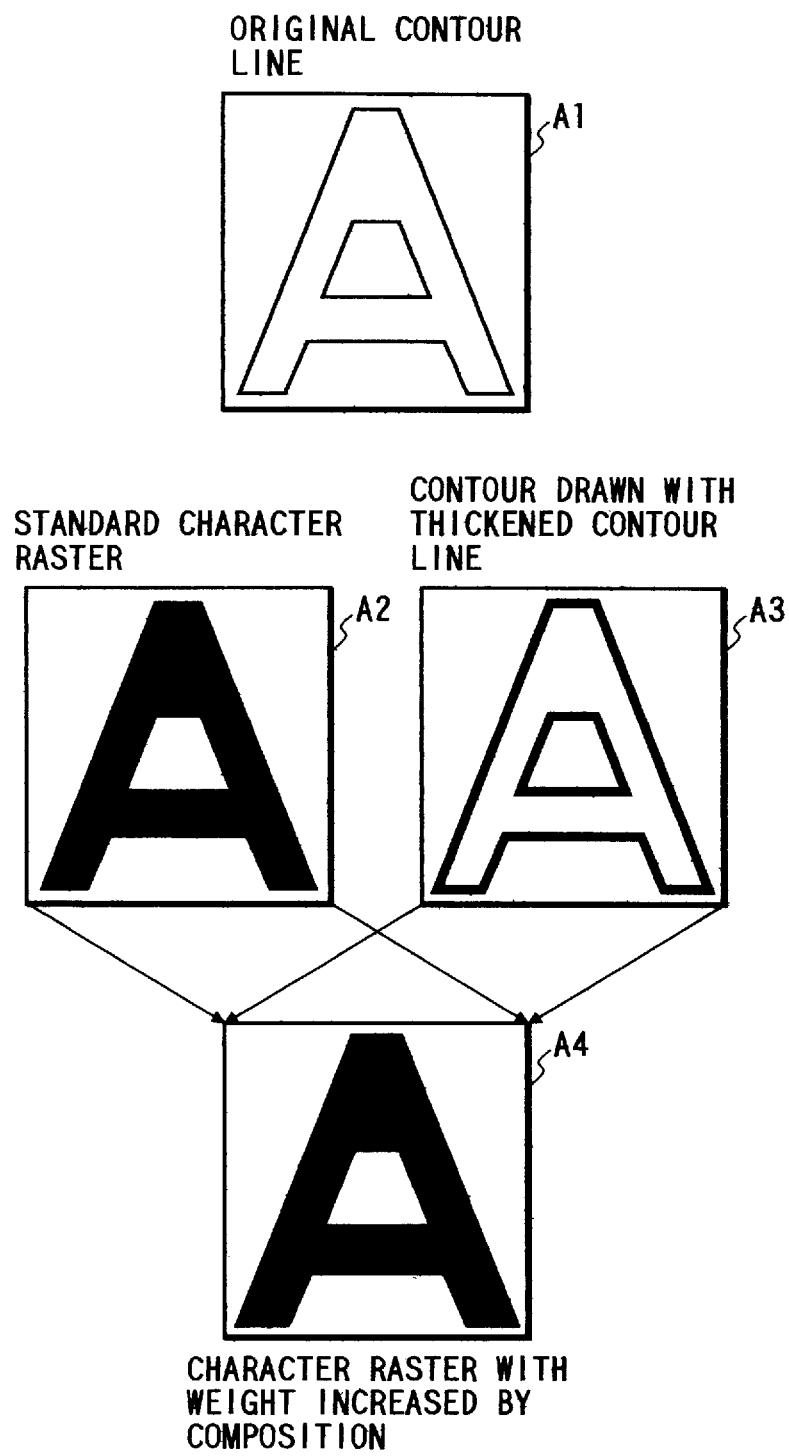
FIG. 13 is an explanatory view of the idea of a weight adjust processing.

At first, describing the idea of the weight adjust processing with reference to FIG. 13, FIG. 13 shows a case in which, when the weight of the requested font is greater than the weight of the substitute font, the weight of the final character is increased.

That is, when a shading processing is performed on a character, an outline or a contour line A1 of the character is drawn. And, in accordance with the contour A1 of the character, a shading processing is performed on the character to thereby generate raster data A2, while the contour line A1 of the character is thickened with a thickness proportional to a set weight difference with the contour line A1 as the center to thereby generate another raster data A3. After then, if the raster data A3 is drawn or written over the raster data A2, then there can be obtained raster data A4 in which the character shown by the raster data A2 is thickened and a weight is added to the character.

On the other hand, to decrease the weight of a character, the data on "black" represented by the raster data A3 may be set for the data on "white" and then the "white" raster data may be drawn or written over the raster data A2, thereby being able to obtain a character which is thinned with the weight thereof decreased.

In this manner, if the contour drawing raster data with a weight difference applied thereto is drawn over the contour line data used to draw the contour line, then the weight of a character can be adjusted with ease.

Next, description will be given below of the idea of the metrics adjust processing with reference to FIGS. 14(*a*) to 14(*c*).

FIG. 14(*a*) shows a character which is drawn by a substitute font, while FIG. 14(*b*) shows the escapement of the character of the requested font set according to the metrics information that is obtained according to the substitute font.

In the present metrics adjust processing, the escapement of the character shown in FIG. 14(*a*) is set for the escapement of the character shown in FIG. 14(*b*), which makes it necessary to perform a deform processing to compress the horizontal width of the character. This deform processing provides a metrics adjust processing. In the case of an outline font, a concrete deform processing can be carried out easily by using a determinant to deform the outline font.

Figure 15:
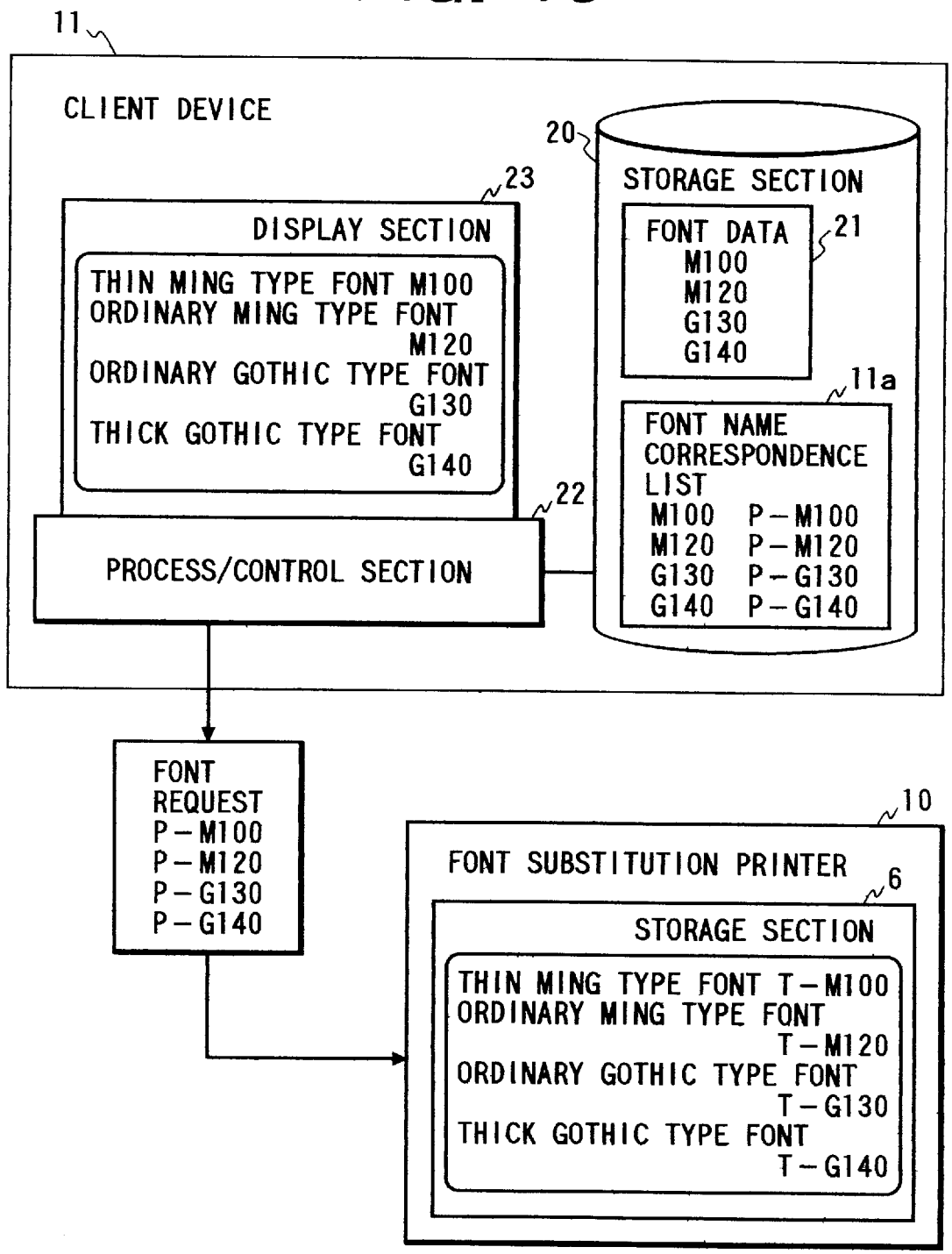
FIG. 15 is a view of a concrete processing to be performed when the font substitution printer is used in accordance with a request from a client device.

Next, description will be given below of a concrete processing to be carried out by use of the font substitution printer 10 in accordance with a request from the client device 11 shown in FIG. 2 with reference to FIG. 15.

At first, the client device 11 comprises a storage section 20, a process/control section 22, and a display section 23. The storage section 20 includes font data 21 consisting of four fonts M100, M120, G130 and G140 respectively to be used by the client device 11, and a font name correspondence list 11*a* representing the correspondence between the above-mentioned four fonts and the font names that can be understood by the font substitution printer 10, that is, the font names that can be identified according to the font attribute data base and the like. And, the process/control section 22 is used to carry out processings such as a processing to create a document using the font data 21. Here, the font M100 is a font of a thin Ming type, the font M120 is a font of an ordinary Ming type, the font G130 is a font of an ordinary Gothic type, and the font G140 is a font of a thick Gothic type.

On the other hand, the font substitution printer 10 includes four loaded fonts T-M100, T-M120, T-G130 and T-G140.

The loaded font T-M100 is a font of a thin Ming type, the loaded font T-M120 is a font of an ordinary Ming type, the loaded font T-M130 is a font of an ordinary Gothic type, and the loaded font T-M140 is a font of a thick Gothic type. And, the four fonts M100, M120, G130, and G140 held by the client device 11 respectively correspond to the loaded fonts T-M100, T-M120, T-G130 and T-G140 that are carried on board the font substitution printer 10, but they are all different fonts.

Here, when a document made up by the client device 11 using the four fonts M100 to G140 is to be output from the font substitution printer 10, the client device 11 issues to the font substitution printer 10 a print command including a font request in which, in accordance with the correspondence relationship specified in the font name correspondence list 11*a*, the font specification of the M100 font is set for the font specification of P-M100, the font specification of the font M120 is set for the specification of P-M120, the font specification of the font G130 is set for the specification of P-G130, and the font specification of the font G140 is set for the font specification of P-G140. On receiving the print command including such font request, the font substitution printer 10 can understand and interpret the font names P-M100 to P-G140 because it includes a font attribute data base which contains these font names therein. Therefore, even when fonts represented by these font names are not stored as loaded fonts in the font substitution printer 10, the font substitution printer 10 is able to generate substitute fonts which respectively correspond to the input requested font names P-M100 to P-G140 and is thus able to output the document requested for output by use of the optimum substitute fonts that are approximate to the requested fonts.

Of course, as shown in FIG. 2, a print command can be given to the font substitution printer 10 using an external storage medium such as a floppy disc or the like, so that a document made up by the client device can be output on line from the font substitution printer 10.

Next, description will be given below of a concrete processing to be performed by the font substitution printer 10 when a print command is given thereto from the client device 12 shown in FIG. 2 with reference to FIG. 16.

Figure 16:
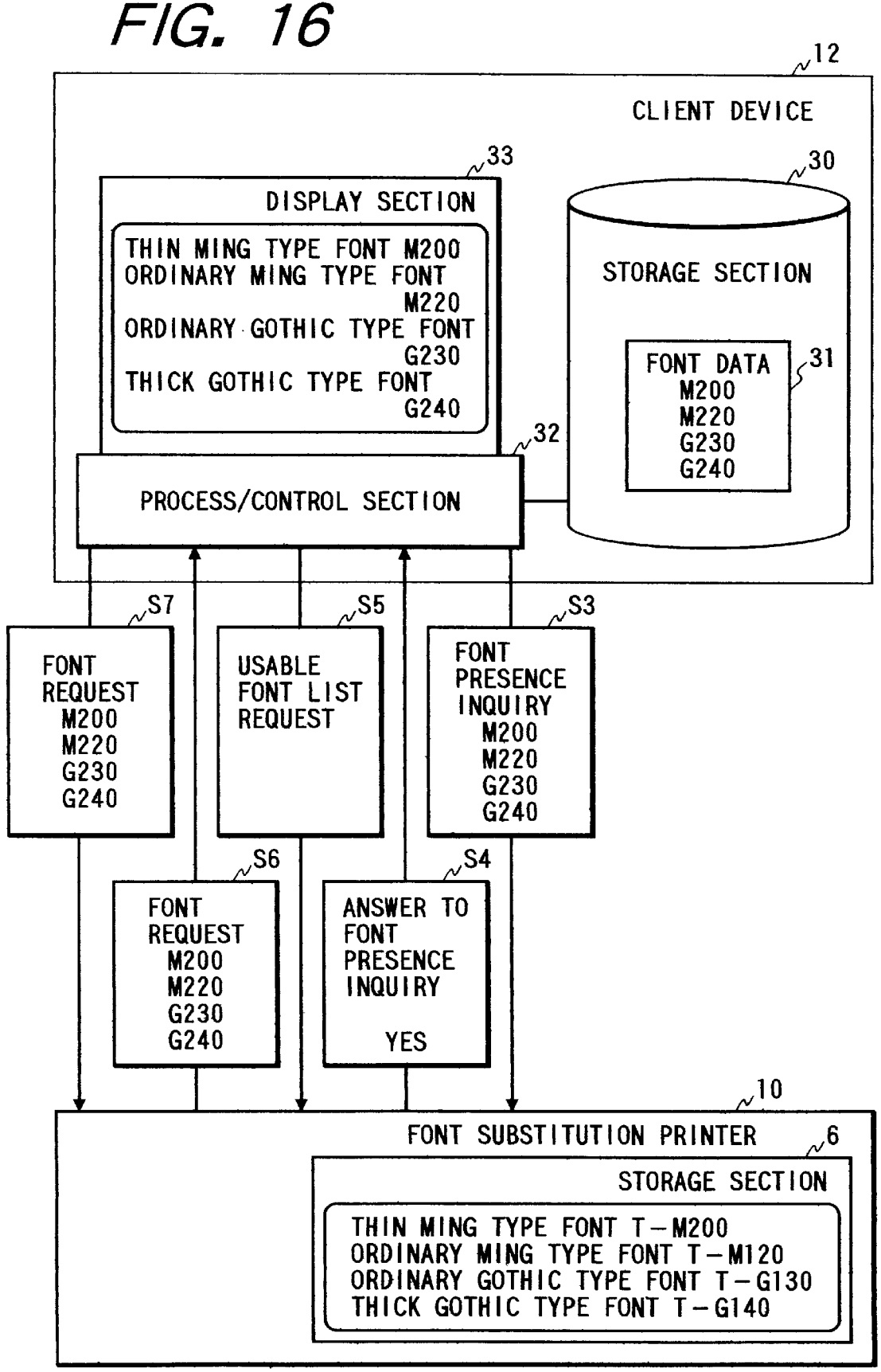
FIG. 16 is a view of a concrete processing to be performed when the font substitution printer is used in accordance with a request from another client device.

Here, the client device 12 shown in FIG. 16 is different from the client device 11 in that it does not hold a font name correspondence list.

Therefore, as has been described in connection with FIG. 2, when the client device 12 makes up a document and outputs it using the font substitution printer 10, the client device 12 must previously know information on fonts which can be used by the font substitution printer 10.

And, to know the usable fonts, as has been described before, according to the first method, it is necessary to make individual inquiry requests of the font substitution printer 10 for the presence of requested fonts and, in accordance with the results of the confirmation of the presence of the requested fonts, the client device 12 issues a print command to the font substitution printer 10. Also, according to the second method, at first, the client device 12 makes a request of the font substitution printer 10 for a list of fonts which can be used by the font substitution printer 10. After then, with reference to the list of the usable fonts, the client device 12 confirms the presence of a requested font and, in accordance with the result of the requested font presence confirmation, it sends out a print command to the font substitution printer 10.

Here, the client device 12 includes a storage section 30 having font data 31 consisting of four fonts M200, M220, G230 and G240 to be used by the client device 12, a process/control section 32 used to perform processings such as a processing to make up a document using the font data 31, and a display section 33. In particular, the font M200 is a font of a thin Ming type, the font M220 is a font of an ordinary Ming type, the font G230 is a font of an ordinary Gothic type, and the font G240 is a font of a thick Gothic type.

On the other hand, the font substitution printer 10 includes four loaded fonts T-M200, T-M220, T-G230 and T-G240. Here, the loaded font T-M200 is a font of a thin Ming type, the font T-M220 is a font of an ordinary Ming type, the font T-G230 is a font of an ordinary Gothic type, and the font T-G240 is a font of a thick Gothic type. And, the four fonts M200, M220, G230 and G240 respectively held by the client device 12 and the four loaded fonts T-M200, T-M220, T-G230 and T-G240 respectively loaded on board the font substitution printer 10 are all different from one another.

Here, according to the first method, when a document made up by the client device 12 and using the four fonts M200 to G240 are to be output from the font substitution printer 10, the client device 12 inquires of the font substitution printer 10 as to whether the fonts having the font names M200 to G240 used in the made-up document can be respectively used or not (S3). In response to this, the font substitution printer 10 compares the font names M200 to G240 with the font attribute data base and loaded font list, and then gives the client device 12 an answer as to whether the requested fonts can be used or not (S4). And, when the client device 12 receives an answer that the fonts are usable, it sends out to the font substitution printer 10 a print command including the specification of the font names M200 to G240 (S7) and, responsive to this, when it is necessary to generate a substitute font, the font substitution printer 10 generates the substitute font and outputs a document which is requested to be output.

On the other hand, according to the second method, the client device 12 firstly makes a request of the font substitution printer 10 for the list of the usable fonts (S5). In response to this, the font substitution printer 10 gives a list of usable fonts including the usable fonts M200 to G240 (S6). Since the fonts M200 to G240 are included in the usable font list, the client device 12 judges that the document can be output from the font substitution printer 10 and thus sends out a print command including the specification of the font names M200 to G240 to the font substitution printer 10 (S7). And, the font substitution printer 10, when it is necessary to generate a substitute font, generates the substitute font before it outputs the document that is requested for output.

As has been described heretofore, according to the first aspect of the invention, when, in response to a request for use of a font, a desired font is selected out of a plurality of loaded fonts loaded on board a printer and a character is output using the selected font, first extract section extracts a first font attribute from the font identifier of the requested font, second extract section extracts a second font attribute from the font identifier of a loaded font loaded on board the printer, select section, when the requested font is present in the loaded fonts, selects this font and, when not present, compares the first font attribute extracted by the first extract section with the second font attribute extracted by the second extract section to thereby calculate a similarity between the first and second font attributes and selects a substitute font in accordance with the thus calculated similarity, and character output section outputs a character in accordance with the font selected by the select section.

Therefore, the first aspect of the invention has an advantage that it is able to obtain the optimum font similar to the requested font.

According to the second aspect of the invention, a client device includes a font name list which represents the correspondence between the font names of fonts loaded on board the client device and the font names of fonts loaded on board a character output device and, when the client device requests the character output device to output a document which is made up by the client device using the fonts loaded on board the client device, the client device makes this request by use of the font names of the fonts loaded on board the character output device in accordance with the correspondence shown in the font name list.

Therefore, the second aspect of the invention is advantageous in that it is able to know immediately the output requested fonts that can be understood by the character output device.

According to the third aspect of the invention, when font presence confirm section receives an inquiry about confirmation of presence of a font from a client device, it checks the font for presence and, if it finds that the font is present in loaded fonts or the font can be substituted by the font substitute function, then it confirms that the font is present and notifies the client device of the confirmation result.

Therefore, the third aspect of the invention has an advantage that it is able to know the requested font names that can be processed positively.

According to the fourth aspect of the invention, on receiving a request for a list of usable fonts from a client device, usable font output section finds the font names of fonts which can be font substituted by the font substitute function and then informs the client device of a list of the thus found font names.

Therefore, the fourth aspect of the invention is advantageous in that it is able to know the requested font names that can be processed positively.

What is claimed is:

1. A character output device, responsive to a request for use of a font, for selecting a desired font out of a plurality of fonts available and loaded on board a printer for rendering and outputting a character using the selected font, said character output device comprising:

first extraction means for extracting attribute values of a plurality of font attributes based on a font identifier of the font requested for use;

second extraction means for extracting attribute values of the plurality of font attributes of loaded fonts based on a font identifier of the fonts loaded on board the printer;

calculation means for calculating correlation distances between the font requested for use and the loaded fonts based on differences between the attribute values extracted by said first extraction means and the attribute values extracted by said second extraction means for the respective font attributes;

substitute font selection means for selecting a substitute font with a predetermined priority from the plurality of loaded fonts based on the correlation distances respectively calculated by said calculation means; and character output means for outputting a character based on the font requested for use when the font requested for use is present in the loaded fonts and for outputting a character based on the substitute font selected by said selection means when the font requested for use is not present in the loaded fonts.

2. The character output device as set forth in claim 1, further comprising a font attribute data base in which attribute values of the plurality of font attributes are stored corresponding to the font identifier, wherein said first extraction means and said second extraction means extract attribute values from said font attribute data base.

3. The character output device as set forth in claim 2, further comprising a typeface attribute data base in which typeface attributes represented by typeface names are stored, wherein said first extraction means and said second extraction means extract typeface attributes represented by typeface names from said typeface attribute data base based on typeface names extracted from said font attribute data base.

4. The character output device as set forth in claim 3, wherein said typeface attribute data base includes as a typeface attribute at least one of a vertical stem width, a horizontal stem width, a counter, a bounding box rate, a black spot rate and a serif rate.

5. The character output device as set forth in claim 4, wherein said calculation means calculates the correlation distances by accumulating squared differences between the attribute value of the font requested for use and attribute values of the loaded fonts for the respective typeface attributes.

6. The character output device as set forth in claim 1, wherein said substitute font selection means creates a list of substitute typefaces for the typeface of the font requested for use based on the correlation distances calculated with respect to the plurality of loaded fonts by said calculation means, and selects a loaded font of typeface satisfying another attribute for the font requested for use with priority corresponding the correlation distance from the list of substitute typefaces.

7. The character output device as set forth in claim 6, wherein said substitute font selection means selects a loaded font of typeface satisfying encoding which is a predetermined character row of the font requested for use.

8. The character output device as set forth in claim 7, further comprising an encoding data base in which encoding rearrangement information which is a substitute for encoding is stored, wherein said substitute font selection means finds substitute encoding from said encoding data base when encoding of the font requested for use for substitute typeface is not present in the loaded fonts, and selects a loaded font satisfying the substitute encoding.

9. The character output device as set forth in claim 8, wherein said substitute font selection means selects a loaded font of typeface satisfying encoding for typeface of a next priority or substitute encoding from the list of substitute typefaces when a loaded font satisfying substitute encoding for substitute typeface is not present.

10. The character output device as set forth in claim 8, wherein the substitute encoding divides one encoding into a plurality of ones and re-arranges into another encoding for each divided ones, and said substitute font selection means selects a loaded font of typeface satisfying encoding or substitute encoding for each encoding partially re-arranged.

11. The character output device as set forth in claim 2, further comprising weight difference finding means for finding a stem width of the font requested for use and a stem width of a font selected by said substitute font selection means from said font attribute data base, and for finding a weight difference between both of the fonts based on both of the stem widths, and weight adjustment means adjusts the stem width of the font selected by said substitute font selection means based on the weight difference obtained by said weight difference finding means.

12. The character output device as set forth in claim 11, wherein said weight difference finding means finds the weight difference between both of the fonts based on a vertical stem and/or horizontal stem.

13. The character output device as set forth in claim 11, wherein said weight difference finding means finds the weight difference for widths of vertical stem and horizontal stem, and said weight adjustment means adjusts the stem width independently from the widths of vertical stem and horizontal stem.

14. The character output device as set forth in claim 2, wherein said character output means finds metrics information of the font requested for use or the substitute font from said font attribute data base, and outputs characters with feeding width based on the found metrics information.

15. The character output device as set forth in claim 14, wherein said character output means adjusts a width in a direction of feeding a character image based on the found metrics information.

16. The character output device as set forth in claim 1, further comprising register means for registering the substitute font selected by said substitute font selection means as the font requested for use in the loaded fonts.

* * * * *